Sept. 2, 1958     H. L. ETCHELL     2,849,797
CHECKING GAUGE
Filed Oct. 9, 1953     3 Sheets-Sheet 1
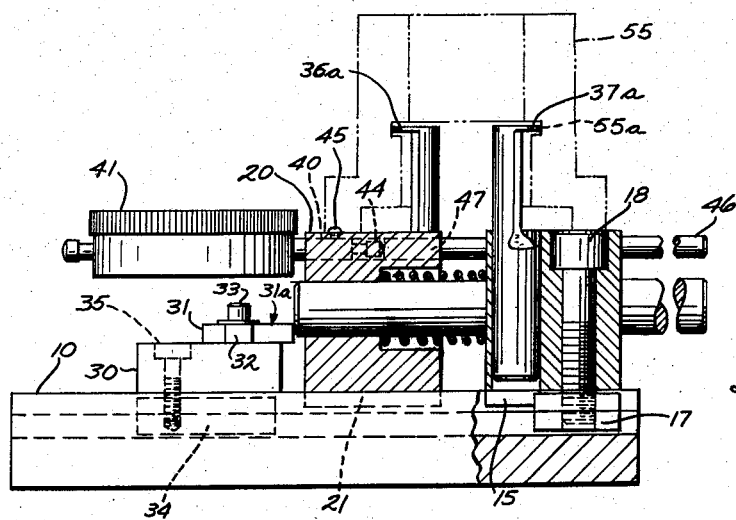
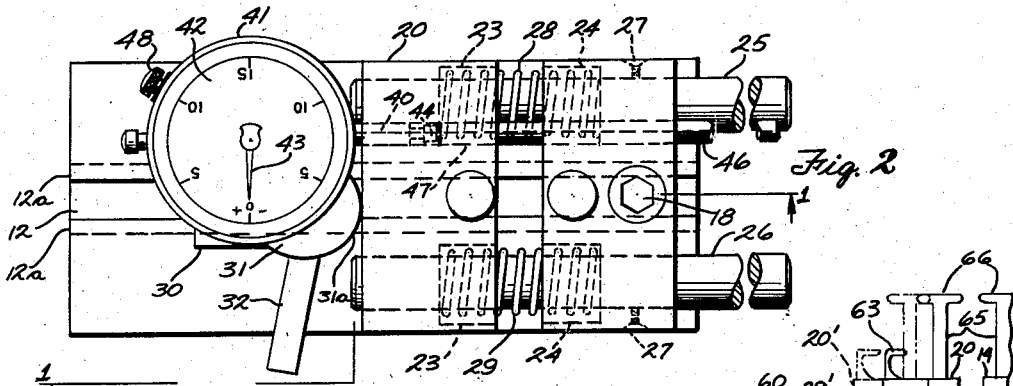
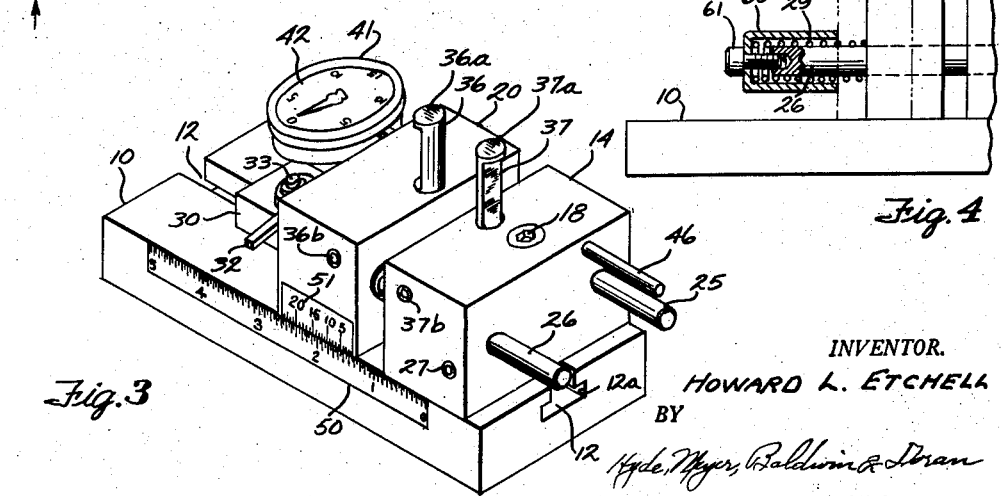
INVENTOR.
HOWARD L. ETCHELL
BY
ATTORNEYS Sept. 2, 1958      H. L. ETCHELL      2,849,797
CHECKING GAUGE
Filed Oct. 9, 1953      3 Sheets-Sheet 2
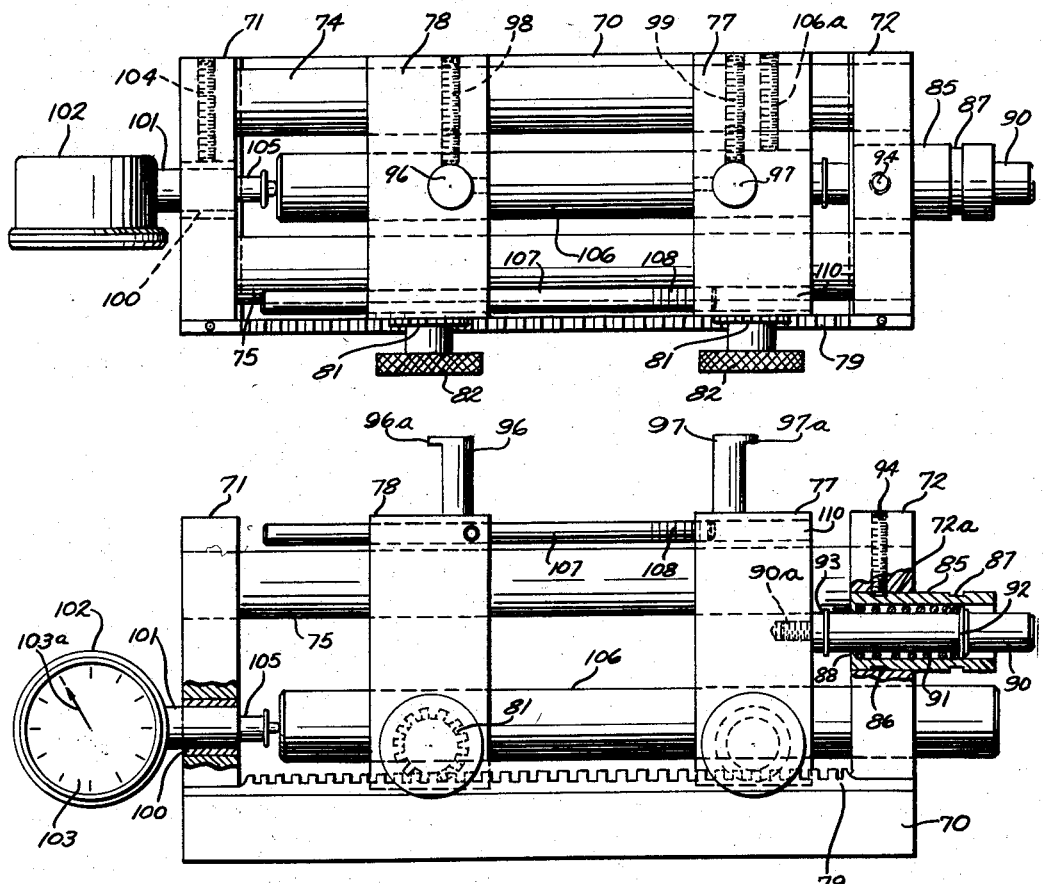
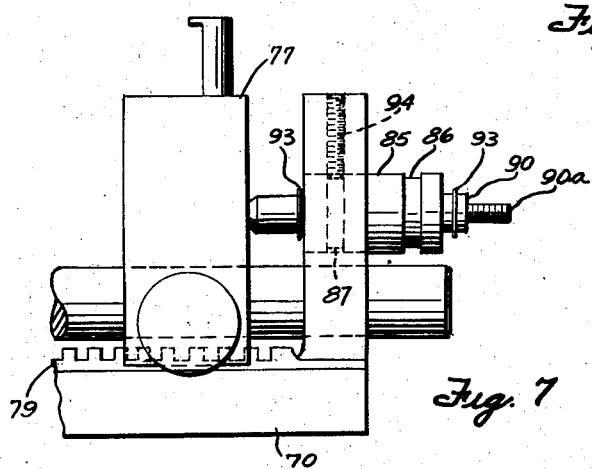
INVENTOR.
HOWARD L. ETCHELL
BY
*Hyde, Meyer, Baldwin & Doran*
ATTORNEYS Sept. 2, 1958

H. L. ETCHELL 2,849,797

CHECKING GAUGE

Filed Oct. 9, 1953

INVENTOR.
HOWARD L. ETCHELL
BY
Hyde, Meyer, Baldwin & Doran
ATTORNEYS

United States Patent Office 2,849,797
Patented Sept. 2, 1958

2,849,797

CHECKING GAUGE

Howard L. Etchell, Maple Heights, Ohio, assignor to Bedford Gear and Machine Products, Inc., Bedford, Ohio, a corporation of Ohio Application October 9, 1953, Serial No. 385,106

11 Claims. (Cl. 33—147)

This invention relates to measuring and gauging apparatus and more particularly to a gauge designed for the accurate determination of either internal or external measurements.

An object of the invention is to provide a gauge having a pair of cooperating gauging elements adjustably mounted with respect to one another, the variation of their relative positions being shown on indicating means to a high degree of accuracy.

Another object of the present invention is to provide a gauge which can be easily disassembled and one in which all major parts are quickly and easily adjustable.

Another object is to provide a measuring apparatus by which dimensions of various objects may be measured expeditiously and with a high degree of accuracy, and one which can be used by a relatively inexperienced operator.

Another object of the present invention is to provide a measuring device characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a detail sectional view of a measuring instrument or a guage embodying the present invention taken on the planes of line 1—1 of Fig. 2.

Fig. 2 is a top plan view of the gauge.

Fig. 3 is a perspective view of the same.

Fig. 4 is a fragmentary side elevational view of a modified spring arrangement for my novel gauge with a part of the side wall of the spring supporting housing broken away.

Fig. 5 is a top plan view of a modified embodiment of my gauge.

Fig. 6 is a side elevational view of the device illustrated in Fig. 5 with portions broken away to more clearly show the reversible pusher-puller element.

Fig. 7 is a fragmental view of the device shown in Fig. 6 showing the pusher-puller element in a pushing position, reversed from that shown in Fig. 6.

Figure 8:
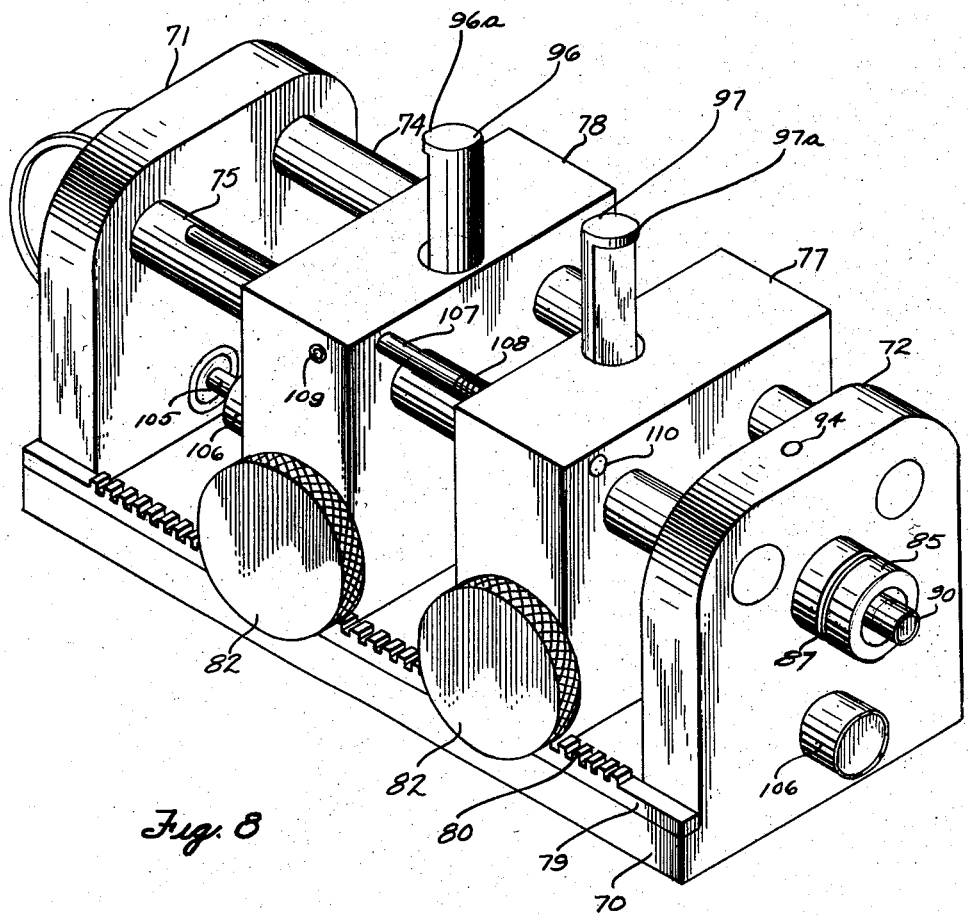
Fig. 8 is a perspective view of the modified form of my novel gauge.

Referring now to the drawings, the apparatus illustrated in Figs. 1 to 4 comprises a base plate 10 having a shouldered slot or T-groove 12 having enlarged shoulder portions 12a extending longitudinally in the surface of said plate. The slot 12 and shoulder portions 12a form a way for a gauging block 14. The gauging block or element 14 is slidably mounted on the surface of the base plate 10. The block is so formed that a tongue portion or way follower 15 extends into and fits snugly in the slot 12 and is thereby guided for reciprocation along slot 12. Of course, it will be understood that the way may be provided in gauging block with the way follower provided on the base plate. A headed member or clamp 17 is slidably seated and supported in the shoulder portions 12a. Said member 17 is positioned beneath the guide block 14 and attached thereto by means of a bolt 18 extending through an aperture in said block and in screw threaded engagement with said headed member 17. The head of said bolt 18 is countersunk below the surface of block 14. Tightening the bolt 18 causes the headed member to be drawn upwardly into frictional engagement with the surface of the shoulder portions 12a, thereby securing the gauging block 14 against displacement.

A second adjustable gauging block or element 20 is also slidably mounted on the surface of base plate 10 adjacent to the gauging block 14 and adapted for horizontal movement with respect to base plate 10. A portion 21 of the block extends downwardly into and fits snugly in the slot 12 and is therein guided for relative movement toward and away from the cooperating gauging block 14.

Guide means in the form of a pair of horizontal guide bars or pins 25 and 26 parallel to and spaced above the top of plate 10 extend between blocks 14 and 20, each pin having one end secured within the block 14 and the other end slidably but snugly received within the block 20. Said bars 25 and 26 are secured within the block 14 by means of two lock screws 27. A pair of coil springs 28 and 29 are disposed on the bars 25 and 26 and positioned between said gauging blocks. Said springs cooperate to normally urge the blocks apart. The ends of said springs are retained in countersunk bores or depressions 23 and 24 formed in the side walls of the gauging blocks 20 and 14 respectively.

The extent to which block 20 can yieldingly move away from the positioned block 14 is limited by means of a stop plate 30, upon which is mounted a pivoted cam 31 having an eccentric rise 31a and a handle 32. The cam is pivotally attached to the plate 30 by means of a pin 33. The stop plate 30 is slidably mounted on the surface of the base plate 10. The plate 30 is held in a desired position of adjustment by means similar to those used with the gauge block 14, namely, a headed clamping member 34 which is slidably seated and supported in the shoulder portions 12a. This member is positioned beneath the stop plate and held fast therein by a bolt 35 extending through the plate 30 and threadedly engaging the headed member 34. By tightening the bolt, the headed member is brought into frictional engagement with the shoulder portions 12a and thereby secures the stop plate 30 against displacement. By adjusting the positioning of the plate 30, it is possible to limit the separating thrust of springs 28 and 29 upon the two spaced gauging blocks 14 and 20. Rotating the cam handle 32 causes the rise 31a of the cam 31 to engage the surface of block 20 and move the block 20 horizontally along the base plate 10 toward the cooperating block 14.

Each of the gauging blocks 20 and 14 is provided with a gauging element or finger 36 and 37 respectively. These elements project vertically upward from the top of the associated gauging blocks so that they may contact with the workpiece. The elements 36 and 37 contain work contacting gauging points 36a and 37a respectively. The points are directed outwardly or in opposition to one another when it is desired to measure inner diameters as seen in Figs. 1 and 3. For gauging exterior dimensions, the gauging elements 36 and 37 may be removed from the blocks 14 and 20 and replaced by another pair of elements particularly suited for that purpose. The gauging elements are held in the gauging blocks by set screws 36b and 37b respectively and are adapted to be readily changed to measure either an internal or an external surface of a workpiece.

The gauging block 20 is bored horizontally at 47 to receive the neck 40 of a dial indicator 41 of standard form having a graduated dial 42 swept by a pointer 43. The neck of the indicator is held in place by means of a screw 45. The indicator has an actuator in the form of a spring plunger 44 reciprocable in the neck and lying in a plane substantially parallel to that of the base plate 10 and directed toward the block 14. The point of said plunger is in constant contact with a feeler pin 46 which extends between the two gauging blocks and has one end fixed in the block 14 and the other end slidably received within the aperture 47 of the block 20. The aperture 47 is aligned with the plunger 44 of the indicator 41, thereby allowing contact between said plunger 44 and feeler pin 46.

Preferably, but not necessarily, a vernier scale is arranged between the block 20 and the base plate 10 as shown in Fig. 3. The main scale portion 50 is located on the side of the base plate 10. The smaller portion 51 of the scale containing the index point and decimal subdivisions is contained on the adjustable gauging block 20. The vernier provides a scale which permits an observer to read very accurately the distance between points 36a and 37a. The dial indicator 41 in somewhat easier to read and particularly useful when quickly checking dimensions within certain tolerances. When using the dial indicator 41 the operator would use the vernier merely to read to the nearest inch or tenth of an inch and the dial for the purpose of reading to the nearest hundredth, thousandth or ten thousandth of an inch.

In setting the parts at the start of any gauging operation, the bolt 18 is first tightened to hold the gauging element 14 in its adjusted position. The adjustable block 20 is then moved to a position adjacent the block 14. In this position the springs 28 and 29, being in compression, tend to urge the blocks 14 and 20 apart. The stop plate is locked in place so as to limit the amount block 20 is separated from block 14.

Let it now be assumed that it is desired to check the inner diameter of a hollow casting 55 whose inner diameter should be 1.425 inches. In one manner of using this invention, the gauging block 20 is positioned adjacent the block 14 so that the reading of the vernier indicating the distance between the contact points 36a and 37a on said blocks is slightly over one inch. The stop plate is then clamped at a point adjacent the block 20 so that actuation of the cam 31 will move the block within the range of 1 to 2 inches. A Johansson block is then employed and by actuation of the cam arm 32, the contact points of gauging fingers 36 and 37 are set exactly 1 inch apart. The dial on the indicator is then set to read zero. This is accomplished by turning the knurled button 48 to bodily move the dial face of the dial gauge until its pointer 43 is caused to register zero on the dial 42. It can be readily seen that any movement of the blocks from this position of adjustment will be transmitted through the feeler pin 46 to the plunger 44 of the indicator 41 and will be registered upon the graduations 42 of the dial 41. The dial should read 0.425 if the hollow casting were measured correctly. The indicator shown in Fig. 2 would not be suitable for this type of measurement but would have to be substituted by an indicator which would read 0.425 inch or higher. The indicator shown in Fig. 2 is of a type suitable for checking certain tolerance limits as hereinafter described. Having previously set the space between the contact points of fingers 36 and 37 at exactly one inch, no reading need be taken on the vernier. Only the variance from the one inch setting need be measured and this can be done on a dial substituted for 41, as hereinabove explained, since this dial was set at zero when the contact points of the fingers were set at exactly one inch apart.

Referring to Fig. 1, the internal bore of the hollow casting 55 is being measured. The handle of the cam is actuated so that gauging points 36a and 37a are closer together to allow the casting to be passed down over the gauge elements 36 and 37. The cam handle 32 is then turned in the opposite direction allowing the springs 28 and 29 to slidably urge the blocks apart until they reach the position seen in Fig. 1 wherein the gauging points 36a and 37a contact the inner surface of the groove 55a of the casting. The fractional parts of an inch in this measurement may be read directly from the dial face of the indicator while the vernier is used to read to the nearest inch.

For quick checking a dimension when certain tolerances over and/or under are permissible, the gauging blocks and the neck of the indicator with the set screw 45 are so arranged that, with a Johansson block of the desired perfect dimension between measuring points 36a and 37a, the needle 43 will register zero.

The dial indicator may also be rotated to a position where a dial is most readily visible by loosening the screw 45 and retightening when the desired position has been reached.

In Fig. 4, another embodiment of my invention is shown. Here the spring means 29' have been removed from their previous location (at 28 and 29) between the gauging blocks to a new position outside of the block 20. The action of the springs in this position is to urge the gauge block 20 toward the block 14 rather than forcing it away from block 14 as was the case previously. The springs 29' are disposed upon that portion of guide bars 25 and 26 which extends beyond the outer edge of the block 20 to the left in Fig. 4. The spring is constrained on each of said bars by means of a cap 60 which is fastened to bar 25 or 26 by a screw 61. The guide bars 25 and 26 are held securely within block 14 as illustrated in Fig. 2. Normally, the springs 29' will urge block 20 to the right as shown by the full line position. The block 20 will be forced to the right until it abuts the block 14, in the absence of an obstruction between them. A handle or finger catch 63 is provided on the upper surface of block 20. This handle makes it possible for the operator to overcome the pressure of springs 29' for separating the blocks to the dotted line position 20' and to allow the work piece to be inserted between the blocks for measuring. The handle 63 may be replaced by a cam similar to 31 shown in Fig. 2 by the addition of a few simple mechanical expedients so that block 20 in Fig. 4 could be moved toward the left by such a cam.

In Fig. 4 a modified gauging element 65 is provided on each of the blocks 14 and 20. Each element contains work contacting engaging points 66 having portions directed both outwardly and inwardly for determining both internal and external measurements without replacing the gauging elements each time. It should be understood that except for the aforesaid structural modifications, the structure of Fig. 4 is identical to that shown in Figs. 1 to 3.

Referring now to Figs. 5 to 8 wherein a modified form of my invention is illustrated, this comprises a base plate 70 having two integral upstanding end portions 71 and 72 substantially perpendicular to the base plate and having approximately the same width. Guide means in the form of a pair of horizontal guide bars or rods 74 and 75 positioned parallel to and spaced above the top of the base plate 70, extend between the upturned end portions 71 and 72. The ends of the guide bars are securely fastened in the upstanding end portions by riveting, welding, press fitting or by any other suitable means. A gauging block 77 is slidably mounted on the surface of the base plate 70. Another gauging block 78 is slidably mounted adjacent the first block 77 on the base plate 70 for horizontal movement thereon. Each of the gauging blocks 77 and 78 is provided with suitable apertures which slidably but snugly receive the guide bars 74 and 75. The blocks are guided for precise movement on the plate 70 by said guide bars which form ways and by the apertures in the blocks which form way followers.

One of the outer side edges of the base plate 70 is provided with a gear rack 79 having a plurality of gear teeth 80 which extend substantially the entire length of said plate. The side of each gauge block is provided with a pinion 81 rotatably mounted in its associated block and having gear teeth that mesh with the rack gear 79. Each pinion has an enlarged knurled head portion 82 adapted for hand engagement, so that an operator can grasp said portion and, by revolving it, cause the block to move along the rack. It should be understood that this invention contemplates modifications such as having the pinions mounted on the base plate and the gauge blocks provided with racks.

A reversible push and pull device is disposed in the upstanding end portion 72 adjacent the gauging block 77. This device is adapted to selectively urge the gauging block 77 toward or away from the gauging block 78. The device comprises a hollow cylindrical housing 85 containing two spaced annular grooves 86 and 87 on its outer surface. Each of said grooves is positioned relatively near a respective end of said housing. The housing is open at both ends, one of said ends having an inwardly turned lip or flange 88. A plunger rod 90 is slidably disposed within said housing and has its end portions protruding outwardly beyond the ends of the housing 85. A coil spring 91 encompasses the plunger and is positioned within the housing 85. One end of the spring abuts the lip 88 while the other end abuts annular flange 92 on the plunger 90. A second flange 93 located on the plunger externally of the housing and spaced from the flange 92 a distance approximately equal to the length of housing 85, abuts against the lip 88 when spring 91 is unrestrained and prevents the thrust of spring 91 from dislodging the plunger 90 from within the housing 85. The device is confined within an aperture 72a in the upstanding end portion 72 by means of a set screw 94 projecting inwardly through the upper surface of the upstanding end to a point where it engages the groove 86 or 87 depending upon which end of the housing 85 has been inserted into the upstanding end 72.

In Fig. 6, the device is set up for a pulling action with respect to gauge block 77. The extreme end of plunger 90 is threaded at 90a to engage the block 77. The thrust of the spring 91 is to the right as viewed in Fig. 6, and the plunger 90 will therefore pull the block 77 to the right.

In Fig. 7, the push and pull device has been reversed and here the set screw 94 engages the groove 87 and the non-threaded end of the plunger 90 abuts block 77. As viewed in Fig. 7, the thrust of the spring 91 is to the left and has the effect of pushing the plunger against block 77 and thereby causing the block to be moved to the left toward engagement with the second gauging block 78. Thus, it can be seen that it is a very simple operation to produce a reversal in the direction in which the gauging block 77 is yieldingly urged. It should be understood that the remainder of the structure of Fig. 7 is identical to that of Figs. 5, 6 and 8.

Each of the gauging blocks 77 and 78 is provided with a gauge element or finger 97 and 96 respectively. These elements project vertically up from the gauging blocks for engagement with a workpiece. The gauging elements contain work contacting gauging points 97a and 96a respectively. The points are directed outwardly or in opposition to one another as seen in Figs. 6 and 8, when it is desired to measure the inner dimension of a workpiece. When measuring external dimensions, the gauging elements can be removed from the blocks and replaced by another pair of elements particularly adapted for that purpose. The gauging elements are securely held in the gauging blocks by set screws 99 and 98 respectively.

The upstanding end portion 71 is bored horizontally at 100 to receive the stem 101 of the dial indicator 102. The dial indicator has a graduated dial 103 swept by a hand or pointer 103a. The stem of the indicator is held in place by a screw 104. In this manner, the dial face of the indicator may be placed in a horizontal, vertical or other position that will facilitate readability. The indicator has an actuator in the form of a spring pressed plunger 105 directed toward the block 77. The point of said plunger is in constant contact with a feeler pin 106 which is adjustably held in the block 77 by means of a screw 106a, extending inwardly from the side of said block. The feeler pin 106 snugly but slidably extends through the block 78, until it contacts the plunger 105. It should be noted that feeler pin 106 is constructed of substantially heavy stock so as to give added support between the gauging blocks 77 and 78. The construction of indicator 102 is such that any movement of plunger 105 is followed by corresponding movement of pointer 104.

Preferably, but not necessarily, a rod 107 having a graduated scale 108 at one end, is adjustably secured in the block 78 by means of set screw 109. The graduated end of said rod extends toward the block 77 which has a horizontal bore 110 adapted to slidably receive said graduated rod. The scale on said rod is a very handy means, during a gauging operation, of determining the number of revolutions made by the pointer 104 of the indicator 102 and also whether the block 77 has returned to its initial or zero set position.

The modification of my gauge shown in Figs. 5 to 8 results in a particularly rugged and precise device. The guide bars 74 and 75 are rigidly fastened to the base 70 by upstanding end portions 71 and 72. The result of this is to produce a substantially unitary box-type frame whose structure is self-supporting on both vertical and horizontal planes. The gauging blocks have their upper portions held by guide bars 74 and 75 which guide bars are actually rigid with the frame. The blocks are slidably supported at their bottoms by the base plate 70. This construction lends great support in accuracy of movement to the gauging blocks because the guide bars and base plate are all rigidly united into a unitary frame. This construction makes possible very precise measurements.

The novel pusher-puller device facilitates the speed with which the device can be converted from one type of measuring operation to another.

The rack and pinion type driving means affords a very simple but rugged and precise means of actuating the gauging blocks over the base plate 70.

In operation, the present modification is quite similar to that of the embodiment shown in Figs. 1 to 4 which has been previously described. In Figs. 5, 6 and 8, for measuring internal dimensions, block 78 is moved to a desired location, after which block 77 is moved toward block 78 until gauging points 96a and 97a will enter the opening to be measured. Then release of block 77 will permit spring 91 to pull point 97a to the limiting dimension carrying feeler pin 106 along and registering on indicator 102. In Fig. 7, for measuring external dimensions, block 77 is pulled toward the right until the piece enters between points 96a and 97a, after which block 77 is released and spring 91 moves block 77 toward the left against the workpiece and pin 106 measures the final position on indicator 102.

In view of the foregoing description, taken in conjunction with the accompanying drawings, it is believed that a clear understanding of the construction, operation and advantages of the device will be quite apparent to those skilled in this art.

It is to be understood, however, that even though there is herein shown and described a preferred embodiment of the invention, the same is susceptible to certain changes fully comprehended by the spirit of the invention.

What is claimed:

1. A gauge comprising a base, a first block slidably mounted on said base, a second block slidably mounted on said base for movement toward and away from said first block, means yieldably urging said second block in one direction relative to said first block, means engaging between said second block and said base for moving said second block along said base, upstanding feeler pins, one on each of said blocks respectively, guide means above and parallel to the top of said base, said guide means passing through both of said blocks and reciprocable in at least one of said blocks, an indicator mounted on said gauge, said indicator having an actuator movable responsive to movement of said second block, said indicator having a hand following and responsive to movement of said actuator, said actuator responsive to the relative position of said blocks.

2. A gauge comprising a base plate, upstanding end portions on said base plate, guide means extending between said end portions, a pair of gauging blocks mounted for horizontal movement on said plate, said blocks slidably and snugly engaging said guide means, means for adjustably retaining one of said blocks in an adjusted position, a reversible spring loaded plunger for selectively pushing or pulling the other of said blocks over the base plate, and indicating means operably connected to said blocks and responsive to the relative positions of said gauging blocks.

3. A gauge comprising a base plate, said base plate having upstanding end portions, guide bars spaced above above and parallel to the top of said base, said guide bars having their ends secured to said upstanding end portions, a pair of gauging blocks on said base plate slidably and snugly received by said guide bars, said gauging blocks being adapted for movement toward and from one another, reversible spring means mounted on one of said upstanding end portions for selectively urging one of said blocks toward or from the other of said blocks, a feeler pin mounted in one of said blocks and slidably extending through the other of said blocks, indicator means mounted in one of said upstanding end portions in operative relation with said pin, said indicator having an actuator and a hand responsive to the movement of said actuator, said actuator following said pin as the block in which the feeler pin is secured moves relative to the other of said blocks, a rack gear on said base and rotatable pinions coacting therewith and mounted one on each of said blocks, said pinions meshing with said rack gear for moving said blocks horizontally along said base.

4. A gauge comprising a base plate, said base plate having upstanding end portions substantially perpendicular to said base, a pair of parallel guide bars spaced above and extending parallel to the top of said base, said guide bars having their ends securely fastened to said upstanding end portions, a first and second gauging block supported for horizontal movement on said base plate, said guide bars slidably receiving said gauging blocks, a rack gear on the side edge of said base plate, a rotatable pinion fastened to the side of each of said blocks, said pinions engaging said rack, thereby retaining the gauging blocks in any desired position, said pinions having enlarged knurled head portions, said pinions being rotated by turning said head portions, rotation of said pinions causing said blocks to be moved horizontally back and forth on said base, a feeler pin fastened to the first of said blocks, said feeler pin extending slidably through the second of said blocks, indicator means mounted in the upstanding end portion adjacent the second of said blocks, said indicator having an actuator and a hand responsive to movement of said actuator, said actuator in operative engagement with said feeler pin, said actuator following said feeler pin as said first block moves back and forth relative to the second of said blocks, a pusher-puller device removably retained in the upstanding end portion adjacent said first block, said device comprising a hollow cylindrical housing, an actuator plunger slidably retained and protruding from both ends of said housing, a spring in said housing urging said plunger in a predetermined direction, said plunger engaging said first gauging block for selective pushing or pulling movement.

5. A gauge comprising a base plate, said base plate having upstanding end portions, parallel guide bars spaced above the top of said base, said guide bars securely fastened to said upstanding end portions, a first and second gauging block supported for horizontal movement on said base plate, said guide bars slidably receiving said gauging blocks, a rack gear on the side edge of said base plate, a rotatable pinion fastened to the side of each of said blocks, said pinions engaging said rack, thereby retaining the gauging blocks in any desired position, said pinions having enlarged knurled head portions, said pinions being rotated by turning said head portion, rotation of said pinions causing said blocks to be moved horizontally back and forth on said base, a feeler pin fastened to the first of said blocks, indicator means mounted in one of the upstanding end portions, said indicator having an actuator and a hand responsive to movement of said actuator, said actuator in operative engagement with said feeler pin, said actuator following said feeler pin as said first block moves back and forth relative to the second of said blocks, a pusher-puller device removably retained in the upstanding end portion adjacent said first block, said device comprising a hollow cylindrical housing, an actuator plunger slidably retained and protruding from both ends of said housing, a spring in said housing causing said plunger to be spring loaded, said plunger engaging said first gauging block for selective pushing or pulling movement.

6. A gauge comprising a base plate, said base plate having upstanding end portions, parallel guide bars spaced above and extending parallel to the top of said base, said guide bars having their ends securely fastened to said upstanding end portions, a first and second gauging block supported for horizontal movement on said base plate, said guide bars slidably receiving said gauging blocks, a rack gear on the side edge of said base plate, a rotatable pinion fastened to the side of each of said blocks, said pinions engaging said rack, thereby retaining the gauging block in any desired position, said pinions having enlarged knurled head portions, said pinions being rotated by turning said head portion, rotation of said pinions causing said blocks to be yieldingly moved horizontally back and forth on said base, a feeler pin fastened to the first of said blocks, said feeler pin extending slidably through the second of said blocks, indicator means mounted in the upstanding end portion adjacent the second of said blocks, said indicator having an actuator and a hand responsive to movement of said actuator, said actuator having an operative connection with said first block, said actuator responsive to the movement of said first block relative to the second of said blocks, a pusher-puller device removably retained in the upstanding end portion adjacent said first block, said device comprising a reversible spring loaded plunger for pushing or pulling the first of said blocks over said base.

7. A gauge comprising a base plate, said base plate having upstanding end portions substantially perpendicular to said base, a pair of parallel guide bars spaced above and extending parallel to the top of said base, said guide bars having their ends securely fastened to said upstanding end portions, a first and second gauging block supported for horizontal movement on said base plate, said guide bars slidably receiving said gauging blocks, a rack gear and rotatable pinions mounted one on each of said blocks and base plate, said pinion meshing with said rack gear for moving said blocks horizontally on said base, a feeler pin fastened to the first of said blocks, said feeler pin extending slidably through the second of said blocks, indicator means mounted in the upstanding end portion adjacent the second of said blocks, said indicator having an actuator and a hand responsive to movement of said actuator, said actuator in operative engagement with said feeler pin, said actuator following said feeler pin as said first block moves back and forth relative to the second of said blocks, a pusher-puller device removably retained in the upstanding end portion adjacent said first block, said device comprising a hollow cylindrical housing, an actuator plunger slidably retained and protruding from both ends of the housing, a spring in said housing causing said plunger to be spring loaded, said plunger engaging said first gauging block for selective pushing or pulling movement.

8. A gauge comprising a base plate, said base plate having upstanding end portions, guide bars spaced above and parallel to the top of said base, said guide bars having their ends secured to said upstanding end portions, a pair of gauging blocks on said base plate slidably and snugly received by said guide bars, said gauging blocks being adapted for movement toward and from one another, reversible spring means mounted on one of said upstanding end portions for selectively urging one of said blocks toward or from the other of said blocks, a feeler pin mounted in one of said blocks and slidably extending through the other of said blocks, indicator means mounted in one of said upstanding end portions in operative relation with said pin, said indicator having an actuator following said pin as the block in which the feeler pin is secured moves relative to the other of said blocks, coacting gear means on said blocks and base for moving said blocks along said base.

9. A gauge comprising a base, gauging elements on said base, means for slidably securing said elements to said base, said gauging elements adapted for movement toward and from one another, indicating means operably connected to said blocks and responsive to the relative position of said blocks, means for selectively urging one of said blocks toward or from the other of said blocks, said means comprising a hollow cylindrical housing mounted on said gauge, a plunger shaft extending slidably through said housing, said shaft having at least one of its ends protruding from said housing, spring means within said housing for urging said plunger in a predetermined direction, means on said shaft cooperating with said housing for retaining said shaft within said housing, said plunger engaging one of said gauging elements for selective pushing or pulling movement.

10. A gauge comprising a base plate, a first gauging element mounted on said base plate, a second gauging element mounted on said base plate for yielding movement toward and from said first gauging element, said gauging elements having substantially their entire base area engaging said base plate for accurate guiding movement along said base plate, guide means above and parallel to the top of said base plate, the same guide means passing through both of said gauging elements and slidingly reciprocable in at least one of said gauging elements, and gauging means operable in response to variation in the relative position of said gauging elements.

11. A gauge comprising a base member, a first block mounted on said base member, a second block member slidably mounted on said base member for movement toward and away from said first block, means yieldably urging said second block member in one direction relative to said first block, way means on one of said members and way follower means on the other of said members, said way means and follower means cooperating for accurate guiding of sliding movement of said second block member along said base member, upstanding feeler pins one on each of said blocks respectively, an indicator mounted on said gauge, said indicator having an actuator movable responsive to movement of said second block member, said indicator having a hand following and responsive to movement of said actuator, said actuator responsive to the relative position of said blocks.

References Cited in the file of this patent

UNITED STATES PATENTS

| | | |
|---|---|---|
| 1,337,018 | Lockey et al. | Apr. 13, 1920 |
| 1,625,462 | Frauenthal | Apr. 19, 1927 |
| 1,634,156 | McCommon | June 28, 1927 |
| 1,635,908 | Stuart | July 12, 1927 |
| 2,412,421 | Polk et al. | Dec. 10, 1946 |
| 2,427,924 | Rose | Sept. 23, 1947 |
| 2,636,278 | Krause | Apr. 28, 1953 |

FOREIGN PATENTS

| | | |
|---|---|---|
| 319,041 | Italy | June 27, 1934 |